No. 872,866. PATENTED DEC. 3, 1907.
E. VIAL, DEC'D.
L. B. VIAL, B. VIAL & G. VIAL, HEIRESSES-AT-LAW.
MUD RETAINER OR COLLECTOR FOR WATER CLARIFYING TANKS.
APPLICATION FILED MAR. 17, 1906.
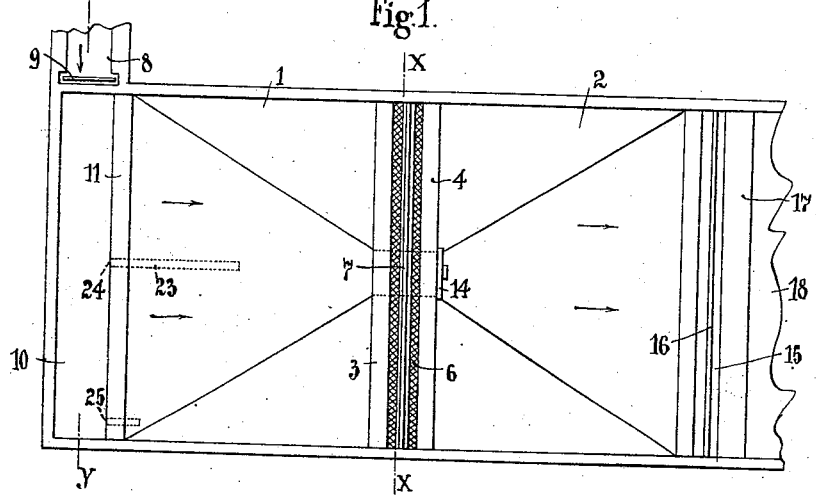
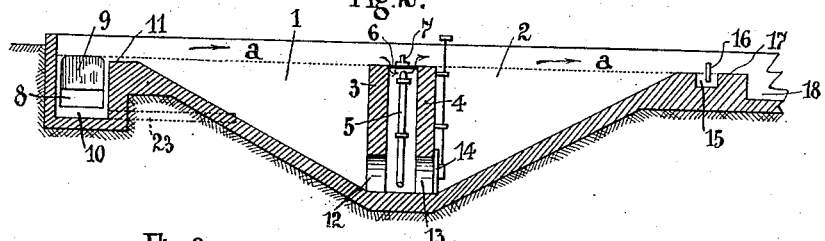
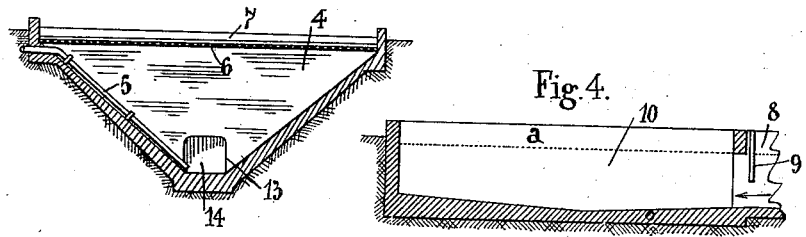
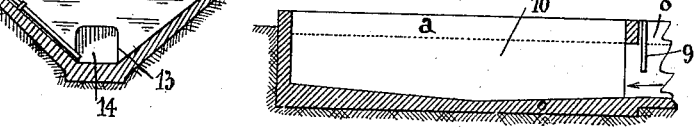
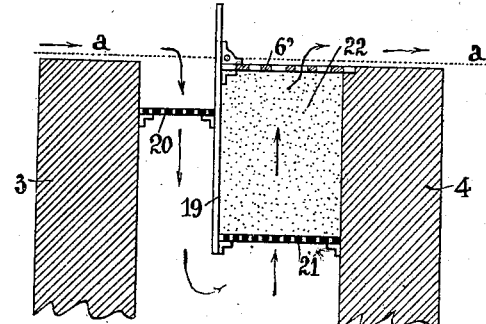
WITNESSES.
Wm. D. Bell.
A. Glatt
INVENTOR:
Emile Vial
by
Gartner & Steward Attys

UNITED STATES PATENT OFFICE.

EMILE VIAL, OF BRUSSELS, BELGIUM; LOUISE BOURGOIN VIAL, BLANCHE VIAL, AND GABRIELLE VIAL HEIRESSES-AT-LAW OF SAID EMILE VIAL, DECEASED.

MUD RETAINER OR COLLECTOR FOR WATER-CLARIFYING TANKS.

No. 872,866.     Specification of Letters Patent.     Patented Dec. 3, 1907.

Application filed March 17, 1906. Serial No. 306,512.

*To all whom it may concern:*

Be it known that I, EMILE VIAL, engineer, a citizen of the French Republic, residing at 142 Rue Belliard, Brussels, Belgium, have invented new and useful Improvements in Mud Retainers or Collectors for Water-Clarifying Tanks; and I do hereby declare the following to be a full, clear, and exact description of the same.

My present invention relates to mud-retainers or collectors for water clarifying tanks, the object being to provide a mud-collector of this kind, capable of retaining in a mechanical way nearly the whole of the heavy sediments contained in the water to be clarified, prior to the entrance of the latter into the clarifying tank proper.

In the accompanying drawings, I have shown the preferred form of construction of my improved mud-collector.

Figure 1 is a top plan view of the construction. Fig. 2 is a vertical longitudinal section of same. Fig. 3 is a vertical cross-section on line $x$—$x$ of Fig. 1. Fig. 4 is a vertical cross-section on line $y$—$y$ of Fig. 1, and Fig. 5 is an enlarged longitudinal section of a modified form of controlling grate hereinafter referred to.

Referring to Figs. 1, 2, 3, the mud-retainer and collector is digged in the form of a funnel and divided into two compartments 1, 2 by means of two parallel transverse partitions 3, 4 extending upwardly to the level of water circulation $a$, and arranged at some distance apart from each other; arranged between said partitions and on the sloping side of the collector is a suction pipe 5 for removing the mud from the collector, and between the tops of said partitions is a grate 6 with relatively large openings. Arranged on the latter is a small vertical plain wall 7, preferably T-shaped, extending over the entire width of the collector, so as to form an impediment to the circulation. The object of the wall 7 is to break and control the current by causing the water to pass twice through the grate 6 as shown by arrows in Fig. 2. This controlling action facilitates highly the physical effect in view at the entrance of the collector.

The muddy water brought to the collector through a channel 8, enters the same from the side, when the plan of the collector is of rectangular form, or tangentially when said plan is of a curved form. The muddy water first passes below a transverse wall 9, extending downwardly below the level of circulation and causing the materials in suspension in the water to be also lowered far below the level of circulation $a$. Then the water enters a transverse compartment 10, arranged to contain and retain a large heap or stratum of mud. This muddy stratum, which may be formed artificially or be a result of the natural deposit of mud, has for its object to mechanically attract and retain in its internal part the particles suspended in the muddy water, while the aqueous portions of less density are spread or distributed over the collector proper by passing above the wall 11, arranged between the compartments 10 and 1.

The compartment 10 is sufficiently deep to avoid a too rapid upward pressure of the mud over the wall 11 which is submerged below the superficial plane of circulation. In fact it is manifest that, when the compartment 10 is filled with mud, the introduction of further mud causes an adequate discharge of sediment without water, by reason of the fact that during the long time of their stay in said compartment 10, the mud has been sufficiently aggregated by the action of its own pressure to overflow but in the form of a compact magma. During the discharge of the latter, it cannot be raised to the level of the aqueous circulating layer owing to the submerging of the wall 11. This particular arrangement results into the fact that water, which has a very large amount of particles in suspension, is deprived almost wholly at its arrival into the mud collector proper, by the effects of suction and compression to which said particles are submitted. The mud formed in this way is moved along the sloping walls of the compartment 1 to the bottom of the collector and is brought to suction-pipe 5 through a large opening 12 provided at the bottom of the first partition 3. A similar opening 13 provided in the second partition 4 and normally closed by means of a sluice-valve 14, serves to empty the second compartment 2 as desired, wherein the circulating water after passing through the controlling grate 6, continues to deposit its suspended particles, until it arrives into the small compartment 15 provided with an impediment 16 and from which the water flows over the weir 17 into the clarifying tank 18.

When it is desired to treat residual water containing floating materials which are not capable of being aggregated, or when it is desired to still further purify the water prior to its introduction into the clarifying tank proper, I arrange the controlling grate as shown in Fig. 5, wherein the grate is divided longitudinally into two parts by means of a downwardly and upwardly extending vertical wall 19. Arranged in the first part is a grate 20 provided with relatively small openings and located sufficiently below the top of the partition 3, to form with the latter and the wall 19 a small receiving compartment, from which the floating material and solid matter may be removed by a suitable rake or the like. In the second part and at a certain distance below the normal upper grate 6' is arranged a perforated sheet iron plate 21, similar to the grate 20 so as to form a compartment 22 containing, according to the art, filtering materials such as gravel, wood fibers, turf and the like. When the materials are agitated from time to time through the upper grate 6', the floating bodies retained therein, may be easily separated therefrom so as to be lowered directly upon the bottom of the collector or moved along a certain way in the second compartment 2 of the collector.

When it is desired or required, the mud retained in the compartment 10 may be discharged into the compartment 1 through a pipe 23, extending from any desired point 24 or 25 (Figs. 1 & 2) of the bottom of the compartment 10 into said compartment 1.

Having fully described my invention, what I claim and desire to secure by Letters Patent is:—

1. In a mud-retainer and collector for water clarifying tanks, the combination, with a tank, of two spaced partitions dividing the tank transversely into two compartments, each partition extending up to approximately the level of circulation and the one having an opening near the bottom thereof, means for admitting the water to be clarified into the compartment adjacent to the partition having said opening, a perforated plate arranged between said partitions in the upper portion thereof, horizontally, and means for causing the water to flow over the partition having said opening, down through said plate and then up through said plate and over the other partition, substantially as described.

2. In a mud-retainer and collector for water clarifying tanks, the combination, with a tank, of two spaced partitions dividing the tank transversely into two compartments, each partition extending up to approximately the level of circulation and the one having an opening near the bottom thereof, means for admitting the water to be clarified into the compartment adjacent to the partition having said opening, a perforated plate arranged between said partitions in the upper portion thereof, horizontally, and a weir arranged above said plate and extending longitudinally thereof, substantially as described.

3. In a mud retainer and collector for water clarifying tanks, the combination of a substantially funnel-shaped tank, two spaced parallel partitions dividing said tank into two compartments and extending upwardly to approximately the level of circulation, one of said partitions having an opening in the lower part thereof, means for admitting the water to be clarified into the compartment adjacent the partition having said opening, and means, extending down into said tank, between said partitions, for removing therefrom the deposited matter, substantially as described.

4. In a mud retainer and collector for water clarifying tanks, the combination of a substantially funnel-shaped tank, two spaced parallel partitions dividing said tank into two compartments and extending upwardly to approximately the level of circulation, one of said partitions having an opening in the lower part thereof, means for admitting the water to be clarified into the compartment adjacent the partition having said opening, means, extending down into said tank, between said partitions, for removing therefrom the deposited matter, and means for causing the water to be clarified to flow over the partition having said opening, then down between said partitions, and then up over the other partition, substantially as described.

5. In a mud retainer and collector for water clarifying tanks, the combination of a substantially funnel-shaped tank, two spaced parallel partitions dividing said tank into two compartments and extending upwardly to approximately the level of circulation, one of said partitions having an opening in the lower part thereof, means for admitting the water to be clarified into the compartment comprising a channel and a wall extending up toward but not to the level of circulation and separating said channel from the tank and means for removing from said tank the deposited matter, substantially as described.

6. In a mud retainer and collector for water clarifying tanks, the combination, with a tank, of two spaced partitions dividing the tank transversely into two compartments, each partition extending up to approximately the level of circulation, a weir arranged between and spaced from said partitions and extending above and somewhat below the level of circulation, filtering substance arranged between said weir and one of said partitions, and means for sustaining said filtering substance, substantially as described.

In testimony whereof, I have signed my name to this specification in the presence of two subscribing witnesses.

EMILE VIAL.

Witnesses:
 CHARLES HANVEY,
 GREGORY PHELAN.